United States Patent [19]
Babinski

[11] Patent Number: 6,082,207
[45] Date of Patent: Jul. 4, 2000

[54] VERTICALLY OPERATING BALL SCREW AND NUT ACTUATOR SYSTEM FOR SYNCHRONOUSLY MOVING MULTIPLE ELEMENTS IN LOAD BALANCED OPPOSED DIRECTIONS, AND METHODS OF CONSTRUCTING AND OPERATING BALL SCREW ACTUATOR SYSTEMS

[75] Inventor: James A. Babinski, Saginaw, Mich.

[73] Assignee: Thomson Saginaw Ball Screw Company, L.L.C., Saginaw, Mich.

[21] Appl. No.: 08/884,612

[22] Filed: Jun. 30, 1997

Related U.S. Application Data

[60] Provisional application No. 60/025,409, Sep. 6, 1996.

[51] Int. Cl.[7] ................................................. F16H 25/20
[52] U.S. Cl. ........................ 74/89.15; 211/1.51; 211/1.57; 312/249.2; 254/103
[58] Field of Search .......................... 74/89.15, 424.8 R; 254/103; 211/1.51, 1.57; 312/9.4, 135, 125, 249.2, 249.4, 249.7

[56] References Cited

U.S. PATENT DOCUMENTS

| | | | |
|---|---|---|---|
| 1,024,582 | 4/1912 | Jones | 49/139 |
| 3,629,744 | 12/1971 | Maier et al. | 335/69 |
| 4,318,304 | 3/1982 | Lang | 74/89.15 |
| 4,548,298 | 10/1985 | Born | 74/424.8 R |
| 5,311,788 | 5/1994 | Kasuga | 74/89.15 |
| 5,493,929 | 2/1996 | Namimatsu et al. | 74/424.8 R |

*Primary Examiner*—Thomas R. Hannon
*Assistant Examiner*—William C Joyce
*Attorney, Agent, or Firm*—Reising, Ethington, Barnes, Kisselle, Learman & McCulloch, P.C.

[57] ABSTRACT

A loaded vertically operating ball screw and nut actuator system, including methods of constructing it, for synchronously moving load systems connected to it in opposite vertical directions has a vertically disposed rotatably driven ball screw device with screw sections of opposite hand. A complemental recirculating ball nut discretely connected to each of the load systems is threaded on each screw section to form ball receiving raceways for trains of load bearing balls which cause the ball nuts to move in opposing directions upon rotation of the screw in either direction. The load systems move in counterbalanced relation under the influence of gravity. A mount system for the upper and lower ends of the screw permits an off-axis adjustment in axial orientation of the screw to compensate for load misalignment problems.

25 Claims, 2 Drawing Sheets

VERTICALLY OPERATING BALL SCREW AND NUT ACTUATOR SYSTEM FOR SYNCHRONOUSLY MOVING MULTIPLE ELEMENTS IN LOAD BALANCED OPPOSED DIRECTIONS, AND METHODS OF CONSTRUCTING AND OPERATING BALL SCREW ACTUATOR SYSTEMS

This invention, which claims the priority of provisional application Ser. No. 60/025,409. filed Sep. 6, 1996, relates to ball nut and screw actuator systems and more particularly to systems for moving relatively heavy load members, and to methods of constructing and operating such ball screw and nut actuator systems.

BACKGROUND OF THE INVENTION

An actuator system of the character to be described may be used very efficiently to move heavily loaded floors, decks and shelves in the high density storage facilities where relatively heavy loads are to be moved. Typically, the supporting structures for such movable load elements are large and fabricated of mass produced structural members, and are not precision manufactured. To the inventor's knowledge nothing of the character to be described herein has been used to provide and overcome the problems encountered in moving such heavy loads. It is believed that scissors jacks have previously been used but, of course, these are not very versatile, smoothly operating actuators which readily self align and can be so readily and economically installed.

SUMMARY OF THE INVENTION

The present invention incorporates a ball screw with axially spaced, opposite hand, ball raceway grooves and a pair of complemental ball nuts which support the load members. The upper end of the system is pivotally suspended for alignment movement in generally one direction and a drive for rotating the ball screw is connected to the ball screw in a manner which permits float of the ball screw actuator in a 90° opposite direction also. The drive or gear box for rotating the screw is mounted for possible alignment movement on a rest pad lateral surface.

One of the prime objects of the present invention is to provide a ball nut and screw actuator mechanism which simultaneously raises and lowers separate loads of like magnitude with minimal effort in a synchronized manner.

A further object of the invention is to provide an actuator system which has a predetermined freedom of movement to overcome any misalignment of the structures to which it is mounted and thereby reduce installation time and provide an automatically correcting self-alignment of the parts which will, as a result, have longer life functionality.

Still a further object of the invention is to provide an actuator system of the character described which places the ball screw system in tensile load to eliminate problems of buckling with compression type loads.

Another object of the invention is to provide an actuator assembly of this type which may be line shaft driven in the sense that additional actuator systems may be driven simultaneously and synchronously.

A further object of the invention is to provide an actuator system of this type employing right and left hand raceway ball grooves which can be roll formed on a single integral bar to thereby reduce cost and add to structural integrity.

Another object of the invention is to provide an actuator system of the character described in which a true synchronization of opposing motion is achieved between two driven ball nuts driven from one power source.

A further objection of the invention is to provide an actuator system which can be very easily installed in a perfect alignment position, and which may be readily and economically manufactured and assembled.

BRIEF DESCRIPTION OF THE DRAWINGS

The presently preferred embodiment of the invention is disclosed in the following description and in the accompanying drawings, wherein.

DETAILED DESCRIPTION OF THE DRAWINGS

Figure 1:
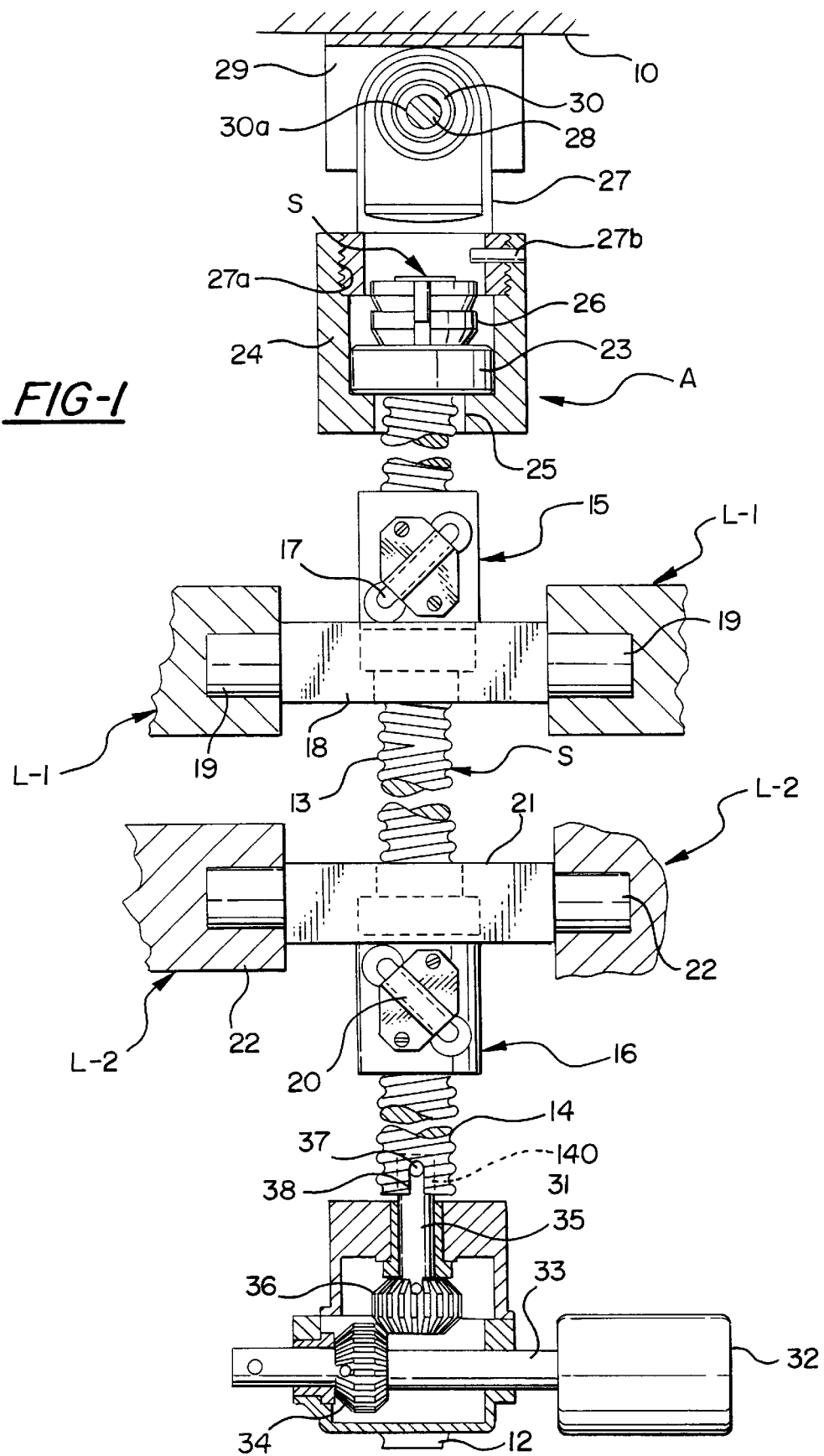
FIG. 1 is a partly sectional, front elevational view of the actuator system of the present invention.
Figure 2:
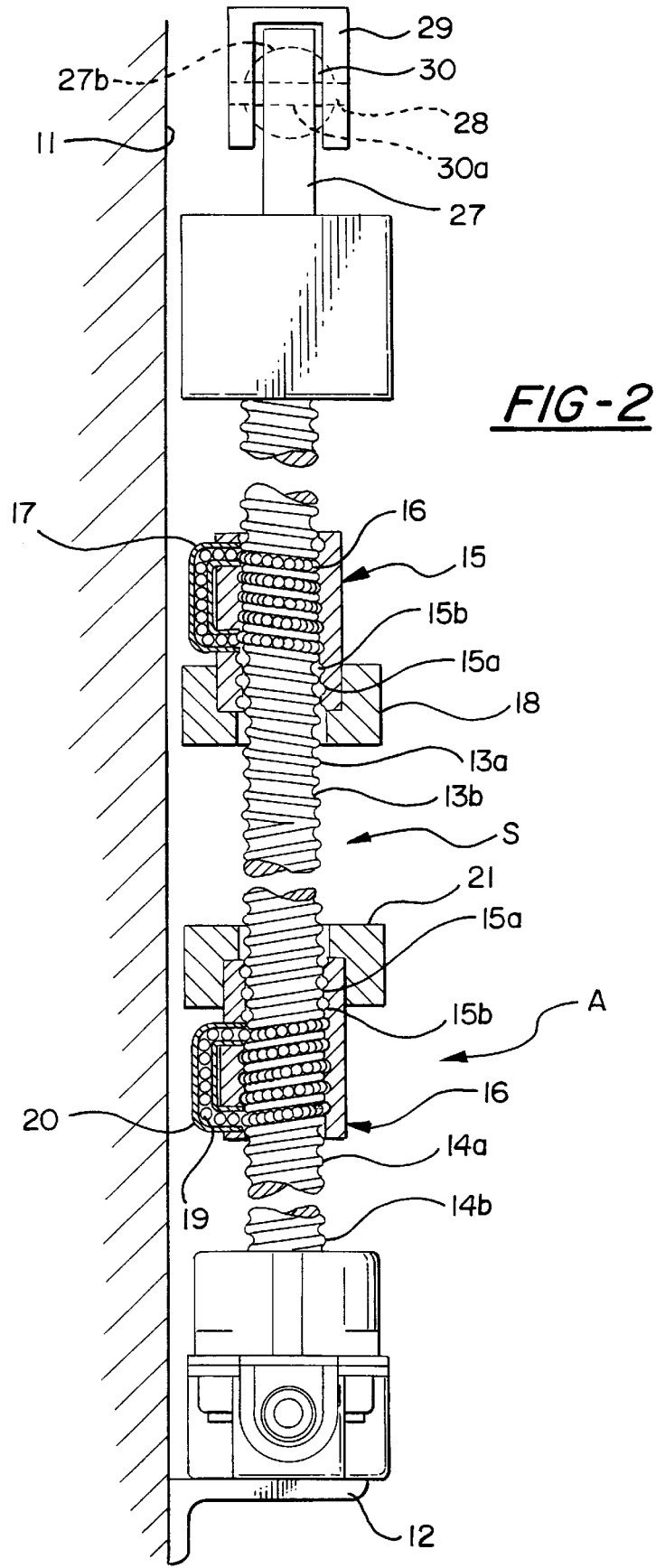
FIG. 2 is a similar side elevational view thereof.

Referring now more particularly to the accompanying drawings, the actuator system of the invention is shown generally at A in FIGS. 1 and 2 and is operative to move loads such as shown at L-1 and L-2 in opposing directions in synchronism. The actuator system is shown as pivotally supported from an upper fixed frame surface 10 adjacent to a fixed wall 11 having an angle shaped rest pad or lateral support surface 12 fixedly secured thereto.

Provided to move the loads L-1 and L-2 in opposite directions is a ball screw, generally designated S, which has an upper screw portion or section 13 with threads at one end and a lower screw portion or section 14 with threads of opposite hand.

The screw portion 13 has helical land portions 13a separated by a helical raceway groove 13b and the threaded portion 14 has helical land portions 14a separated by a helical raceway groove 14b. The pitch or lead of the land or land portions 13a and 14a and the raceway groove portions 13b and 14b is the same, except that it is in the opposite direction. Threaded section 13 may have grooves in the right hand direction whereas threaded section 14 may have grooves in the left hand direction, or vice versa. Threaded sections 13 and 14 may be referenced collectively as a ball screw device.

A ball nut 15 on screw section 13, as FIG. 2 illustrates, has internal complemental helical land portions 15a separated by a helical raceway groove or groove portions 15b. These are complemental to and mate with the land 13a and raceway groove 13b of the screw S. The respective grooves 13b and 15b form a raceway for abutting load bearing balls 16 which travel in the usual recirculating path in the raceway. A conventional ball return tube 17 or other return passage may be provided as part of this recirculating pathway. Ball nut 15 is fixed to a trunnion bar 18 having trunnion supports 19 which couple or connect to the load L-1. Trunnion 18 can be described as a weighted member and trunnion 18 and load member L-1 may be referred to as a load system.

Provided on the portion 14 of the screw S is an opposite hand nut 16 which has helical land portions 15a separated by a helical groove 15b. These are complemental to and mate with the land 14a and groove 14b of the screw section 14. The grooves 14b and 15b form a raceway for recirculating abutting balls 19 and a similar return tube 20 may be provided as part of the recirculating pathway. The raceways and nuts may be referred to as right and left hand. Fixed to the nut 16 is the trunnion bar 21 which has trunnion 22 connecting to and supporting the load L-2. Trunnion 21 can be described as a weighted member and trunnion 21 and load member L-2 may be referred to as a load system, The ball screw is supported by a mount system at its upper and lower ends and the term mount system can be used to include both the upper and lower mounts. At its upper end, screw S is journaled by a thrust bearing 23 fixed in a cup-shaped bearing or bearing housing 24 with an opening 25 for freely passing screw S. A lock nut and washer assembly 26 threads on the upper end of screw S without interfering with its rotation relative to housing 24. A support member 27, which is supported on a clevis cross rod or pin 28, carried by the clevis 29 which fixes to the overhead support 10, threads as at 27a into housing 24. A pin 27c extending through appropriate openings in the housing 24 and member 27 acts as a safety locking device. Mounted within a curvate, partly spherical opening or socket 27b provided in member 27 is an externally partly spherical swivel or ball joint 30. Swivel 30 has an opening 30a for receiving rod or pin 28 and provides some at least limited universality of movement at the upper end of the actuator system. The swivel system permits movement of the clevis 29 and screw in a lateral direction along the axis of the pin 28.

To drive the axially restrained screw S in rotation one way or the other, a gear box assembly or drive housing, generally designated 31, is provided which rests on, but is not connected to, the rest pad 12. Preferably an electric motor, generally designated 32, can power a drive shaft 33 is provided with a bevel gear 34 within gear box 31 to revolve the gear box output shaft or drive transmitter 35. The drive transmitter may take the form of a drive shaft 35 which mounts a bevel gear 36 in mesh with the gear 34 and has a cross coupling rod or pin 37 with ends protruding beyond shaft 35 so as to be accommodated within opposed slots 38 provided in the lower terminal end of screw which is bored as at 14c to freely receive the upper end of shaft 35 in a manner to permit a suitable range of alignment movement to occur. The use of the pin and slot connection 37–38 is well known in the linear actuator prior art for attaching a drive shaft to a screw shaft. At its lower end, shaft 35 may have a pin and slot construction PS with gear 34. Alternatively, the drive transmitter can include any drive member fixed to the screw or could be considered the gear box assembly.

It will be observed that the slots 38 and cross-rod or pin 37 are angularly oriented to align with the clevis rod or pin 28 at the upper end of the assembly. To achieve perfect alignment, the free floating gear box and motor arrangement may allow 5° of universal movement freedom, which normally is very adequate to compensate for misalignment of the structures to which the actuator assembly A is connected. While an electric motor 32 is shown, it should be understood that the drive mechanism could be manually operated by a hand crank, or other motor, with minimum effort required because of the counterbalance effect created by the right hand/left hand raceway arrangement.

In constructing the actuator assembly, the opposite hand thread portions 13 and 14 can be roll formed on the screw shaft S and the opposite hand nuts 15 and 16 then threaded thereon to the position shown in FIGS. 1 and 2 from opposite ends of the screw S. With the clevis 29 and clevis member 27 in the installed position, the upper end of screw S can then be inserted through opening 25 and the opening in thrust bearing 23 to the installed position. After this, the lock nut assembly 26 can be threaded on the upper end of screw S. Then typically, the member 27 can be threaded into the housing 24 and the safety spring pin 27c inserted. After this, the connection between drive shaft 35 and screw S can be made by inserting affixed rod 37 up into slots 38.

Typically in large structures the frame members or walls 10 and 11 are not precision aligned, nor in absolute plumb. To self align, the assembly can adjust at the spherical bearing 30, rod 28, and rod in slot connection 37–38. Moreover the position of gear box 31 on rest 12 can slidably adjust. Trunnion mounts 19 and 22 are also important in assuring correct alignment and reducing installation time. Alignment correction clearances are provided at 29a, 29b, and 31a.

The Operation

The drive of electric motor 32 is transmitted to the gears 34 and 36 to rotate the shaft S. dependent on the direction of rotation, the ball nuts 15 and 16 will either move closer together or further apart synchronously and to the same axial extent.

The disclosed embodiments are representative of presently preferred forms of the invention, but are intended to be illustrative rather than definitive thereof. The invention is defined in the following appended claims.

I claim:

1. A vertically operating, vertical position shiftable ball screw and nut actuator system for synchronously moving a pair of separate loads of generally like magnitude in opposite directions including:

a. an axially restrained vertically disposed rotatable ball screw having screw thread sections of opposite hand, each of said screw sections having helical groove portions separated by land portions;

b. a pair of recirculating ball nuts each mounted on one of said screw sections, and a weighted member connected to each nut to impose one of said loads vertically on one of said pair of ball nuts and the other of said loads vertically on the other ball nut of said pair, each nut having unbroken helical thread portions helically complemental to the respective screw section on which said nut is mounted to form a ball receiving raceway there between;

c. a train of load bearing balls in each of said raceways causing said ball nuts to move in opposing directions upwardly and downwardly upon rotation of said screw in either direction;

d. a shiftable mount system for journaling the upper and lower ends of said screw movably supporting said screw to permit an adjustment of the screw to various positions in vertical axial orientation to compensate for load misalignment problems; and e. a rotary drive transmitter connected to said screw for driving said screw in rotation in either direction and moving said nuts and loads in a generally counterbalanced relationship in opposite vertical directions.

2. The actuator system of claim 1 wherein said mount system includes a top bracket and a bearing device for the upper end of said screw supported for at least limited universality of movement by said bracket.

3. The actuator system of claim 2 wherein said mount system includes a drive housing for said drive transmitter and a rest support for said housing permitting a limited degree of universality of movement of said screw.

4. The actuator system of claim 3 wherein said drive transmitter comprises a drive shaft axially aligned with the lower end of said screw to form an extension thereof, the screw and drive shaft having a pin and slot drive connection permitting relative axial movement of said screw and drive shaft.

5. The actuator system of claim 4 wherein a motor driven shaft extends into said housing and has a geared connection with said drive shaft.

6. The actuator system of claim 2 wherein said bracket supports a crosspin having a ball joint device thereon, and said bearing device has a socket for receiving on said ball joint device.

7. The actuator system of claim 6 wherein said bracket is supported adjacent a fixed wall and said cross pin extends perpendicularly to said wall.

8. The actuator system of claim 7 wherein said nuts have trunnions extending axially parallel to said wall for connecting to said loads.

9. The actuator system of claim 2 wherein said bearing device includes a cup-like support for receiving and supporting a thrust bearing fixed on the upper end of said screw, said bearing device further having a connection member extending upwardly from said cup-like device.

10. The actuator system of claim 9 wherein said connection member has a partly spherical socket, and said bracket mounts a crosspin extending through said connection member, said crosspin having a ball joint received within said socket.

11. The actuator system of claim 1 wherein said screw threads of opposite hand have an equal lead, and said weighted members comprise loads of like magnitude.

12. The actuator system of claim 7 wherein said drive transmitter is a drive shaft; the screw and drive shaft have a pin and slot connection, and the pin thereof defines a first horizontal plane which extends parallel to a second horizontal plane defined by the cross pin.

13. A method of constructing a vertically operating ball screw and nut actuator system for synchronously moving a pair of loads of generally like magnitude in opposite directions where the system includes a vertically displaced ball screw having screw portions of opposite hand, with helical groove portions separated by land portions; a recirculating ball nut threaded on each screw section, said nuts having unbroken helical internal threads of opposite hand helically complemental to the respective screw sections on which they are mounted to form ball receiving raceways therebetween; a train of load bearing balls in the raceways causing the ball nuts to move in opposing vertical directions upon rotation of the screw in either direction; a mount system for the upper and lower ends of the screw restraining axial movement of said screw; a rotary drive transmitter connected to said screw for driving said screw in rotation in either direction, the steps of:
   a) providing the ball screw with vertically spaced screw thread sections of opposite hand;
   b) from opposite ends of said screw moving said nuts of opposite hand vertically along said respective screw sections of opposite hand and providing a train of load bearing balls in said raceways;
   c) connecting weighted members to each hut imposing one of said loads vertically on each nut;
   d) rockably connecting an upper mount for the upper end of the screw which suspends said screw for movement off axis to correct for misalignments and journals the upper end of the screw for rotation, and shiftably connecting a lower mount for the lower end of the screw which is movable to correct for said misalignments and;
   e) connecting the rotary drive transmitter to the screw for driving the screw in rotation in either direction with the nuts and said loads moving in generally vertically counterbalanced relation.

14. The method of claim 13 comprising providing said upper mount with a ring-shaped thrust bearing and inserting the upper end of said screw through said ring-shaped thrust bearing and capturing it in this position.

15. The method of claim 13 comprising the steps of connecting said upper mount to a fixed support in a manner to provide limited universality of off axis adjustment in axial orientation.

16. The method of claim 15 comprising providing said rotary drive transmitter as a drive member, which via a pin and slot connection provides relative axial adjustment of said drive member and screw; providing said lower mount as a rigid lateral support slide surface and mounting a motion transmission housing for sliding movement on said support slide surface; and moving said housing laterally to position said housing on said support slide surface such that the drive member is angularly positioned for connection to the lower end of the screw and provides some limited universality of movement for the lower end of the screw while supporting said screw for rotation and driving said screw.

17. The method defined in claim 15 comprising providing the upper mount as a clevis pin having a ball joint thereon and mounting a connection member having a socket for receiving the ball joint on the ball joint of the pin, the connection member being pivotal perpendicularly to an axis defined by said pi and also having a limited lateral movement about said ball joint in a direction along said axis.

18. The method of claim 15 comprising providing said weighted members as laterally extending trunnions.

19. A vertically operating ball screw and nut actuator vari-positionable system for synchronously moving a pair of loads vertically in opposite directions, including:
   a. a vertically disposed, axially restrained, rotatable ball screw with upper and lower ends and having a screw thread section of right hand and a screw thread section of left hand spaced vertically, each of said screw sections having a helical groove separated by a helical thread;
   b. a shiftable mount system for journaling the upper and lower ends of said ball screw permitting an opposing lateral adjustment of said upper and lower ends to compensate for load misalignments;
   c. a recirculating ball nut mounted on said right hand screw thread section and a recirculating ball nut mounted on said left hand screw thread section, each said nut having an unbroken helical internal thread and a groove helically complemental to the respective groove of the screw section on which each said nut is mounted to form a ball receiving raceway therebetween;
   d. a train of load bearing balls in each of said raceways causing said ball nuts to move in opposing directions upwardly and downwardly upon rotation of said screw device in either direction;
   e. a load connector mounted on each said nut to move with said each said nut as said nuts move in opposite directions with rotation of said screw device; and
   f. a rotary drive transmitter connected to said screw device for driving said screw device in rotation in either direction in a weight countering relationship wherein the power required to rotate said screw to move one of said nuts and its said load connector upwardly is diminished by movement of the other of said nuts and its said load connector downwardly.

20. The actuator system of claim 19 wherein said mount system includes a top bracket and a bearing device for the upper end of said screw device supported for at least limited universality of movement by said bracket; and said bracket supports a crosspin having a ball joint device thereon, said bearing device having a socket received on said ball joint device.

21. The actuator system of claim 20 wherein said bracket is supported adjacent a fixed wall and said crosspin extends perpendicularly to said wall.

22. The actuator system of claim 21 wherein each of said load connectors include trunnions on said nuts extending axially parallel to said wall.

23. The actuator system of claim 20 wherein said bearing device includes a cup-like support for receiving and supporting a thrust bearing fixed on the upper end of said screw, said bearing device further having a connector member extending upwardly from said cup-like device, said connector member having said partly spherical socket.

24. A method of constructing a vari-positionable vertically operating ball screw and nut actuator system for synchronously moving a pair of vertical loads in opposite directions in substantially vertically counterbalanced relation where the system includes a vertically disposed ball screw with an upper and lower end having screw sections of opposite hand, with a helical groove separated by a helical land; a recirculating ball nut threaded on each screw section, the nuts being of opposite hand and having unbroken helical thread portions with a land and groove helically complemental to the respective screw sections to form ball receiving raceways therebetween; a train of load bearing balls in the raceways causing the ball nuts to move in opposing vertical directions upon rotation of the screw in either direction; a mount system for the upper and lower ends of the screw restraining its axial movement; and a rotary drive device connected to said screw for driving said screw in rotation in either direction, comprising:

a) providing said ball screw with screw thread sections of opposite hand, but the same lead;

b) from opposite ends of said screw moving said nuts of opposite hand vertically along said respective screw sections of opposite hand and providing said train of load bearing balls in said raceway;

c) shiftably connecting said mount system to shiftably suspend said screw and journal said screw for rotation while permitting off-true vertical shifting of said screw to correct for misalignment problems;

d) imposing loads of substantially the same magnitude vertically on said nuts, and e) connecting said rotary drive device to said screw for driving said screw in rotation in either direction and moving said nuts in opposite directions in a relationship wherein the power required to rotate said screw to move one nut and its said load upwardly is diminished by movement of the other nut and its said load downwardly.

25. The method defined in claim 24 comprising the steps of: providing the upper mount incorporating a pin having a ball joint thereon and a connector member having a socket received on the ball joint, the connector member being pivotal perpendicularly to an axis defined by said pin and also having a limited lateral movement about said ball joint in a direction along the axis defined by said pin.

* * * * *